June 17, 1958     J. FRIEDL     2,839,116
FLEXIBLE HUB
Filed April 25, 1955

INVENTOR.
JOHANN FRIEDL
BY
ATTORNEY

2,839,116

United States Patent Office

Patented June 17, 1958

2,839,116

FLEXIBLE HUB

Johann Friedl, Donauwoerth, Germany, assignor of one-half to Paul O. Tobeler, doing business under the name of Trans-Oceanic, Los Angeles, Calif.

Application April 25, 1955, Serial No. 503,645

9 Claims. (Cl. 152—31)

This invention relates to a flexible hub and, more particularly, to a flexible hub of a wheel, a pulley and a flexible coupling.

There are a number of known flexible hubs of various constructions. Some are pneumatic; others are made with layers of rubber; some contain springs; and still others are made with hydraulic bumpers. All have some shortcoming as they may be too flexible with not enough stability and strength or they may be too rigid with not enough flexibility. Others are too complicated and too expensive to construct.

The present invention overcomes these difficulties by providing a flexible hub simply constructed and comprising two flexible materials. One is a metal, such as spring steel or beryllium bronze, and the other is natural rubber or similar resilient materials, such as neoprene or one of the soft vinyl polymers. The combination of the spring metal and the elastomeric material produces great flexibility as well as strength. Such a hub serves well in a wheel, in a pulley and in a flexible coupling.

The hub is comprised of two tubular metal rings, such as steel, one inside the other. Between the outer surface of the inner ring and the inner surface of the outer ring, interspaced with the elastic material, are situated tubular spacer rings of metal, such as spring steel, which at one point of their circumference touch the outer circumference of the inner ring and at another point touch the inner circumference of the outer ring.

For further resiliency a number of holes having smaller diameters than the rings, in a generally longitudinal direction, can be interspaced in honeycomb fashion through the elastic material inside and outside the spring spacer tubes. For additional strength with little or no loss of resiliency, tubes of metal, such as spring steel, can be solidly imbedded in the latter holes through the elastomeric material. The entire structure can be made by vulcanizing the rubber or molding one of the suggested plastics around the rings and tubes.

Therefore, an object of this invention is to provide an improved flexible hub in which tubular spring metal tubes are held in place by resilient material.

A principal object of this invention is to provide an improved pulley having a flexible hub.

A further object of this invention is to provide an improved flexible coupling in which two flexible hubs are employed adjacent to each other on separate shafts.

Another object of this invention is to provide a wheel for belt transmission in which the rim of the wheel is also the outside ring of a flexible hub.

Other objects of invention will become apparent from the following description taken in connection with the accompanying drawings, in which—

Figure 1:
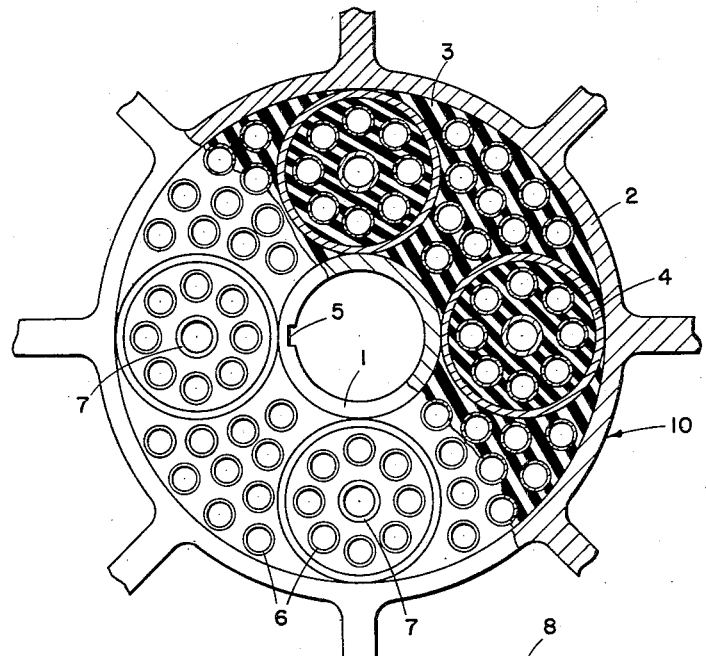
Fig. 1 is an elevational cutaway view of a preferred embodiment of the flexible hub of a wheel.

Referring to Fig. 1 showing a preferred embodiment of flexible hub 10 with the wheel cut away, inner ring 1 has a key slot 5 cut in the inner surface so that it may be keyed to a shaft in order that it can be driven by the shaft or vice versa. Inner ring 1 is within and concentric to outer ring 2. Between outer ring 2 and inner ring 1 are four tubular spacer rings 4. The spacer rings are located symmetrically and are tangent the outer circumference of inner ring 1 and the inner circumference outer ring 2. Between hub rings 1 and 2 a honeycomb-like elastomeric body 3 has been vulcanized or molded around symmetrically spaced small spring steel tubes 6 and 7 and in and around spacer rings 4. Spring steel tubes 6 and 7 extend longitudinally through elastomeric body 3 from one face of the hub to the other. Their longitudinal axes are substantially parallel to the longitudinal axis of the hub in the center of ring 1 about which the hub rotates. Centers of tubes 6, not within spacer rings 4, can have their centers on concentric circles extending outward from the center of the hub. Tubes 6 shown within spacer rings 4 can have their centers symmetrically located on a circle which has a center common with ring 4. Tubes 7 can be located at the centers of rings 4 and are like tubes 6, except that as shown, they can have larger diameters.

The effect of this structure is very simple to comprehend. For example, if ring 2 receives an impact from any direction, it shifts rings 1 and 2 in their respective positions towards each other. By this shifting of location of rings 1 and 2, elastomeric body 3 and interspaced tubes 6 and 7 are partly expanded and partly compressed.

With the expansion and compression of the resilient body 3, together with tubes 6 and 7, the resulting heavy impacts strike with a much reduced force against the shaft and the lighter impacts are annihilated in the flexible hub itself before reaching the shaft. After the gradual dying out of the impact, rings 1 and 2 return to the original position and condition. Tubes 6 and 7, in addition to providing great flexibility, greatly help drive outer ring 2 and the wheel, respectively.

A hub reacting in the above described manner in a compressor drive wheel, for example, would be very desirable, especially on starting. As it is generaly known, many compressors are hard to start and considerably additional torque must be applied on starting than for normal operation. The present invention, thus, would eliminate much of the undesirable forces attacking a shaft driving a compressor when it is being started.

Figure 2:
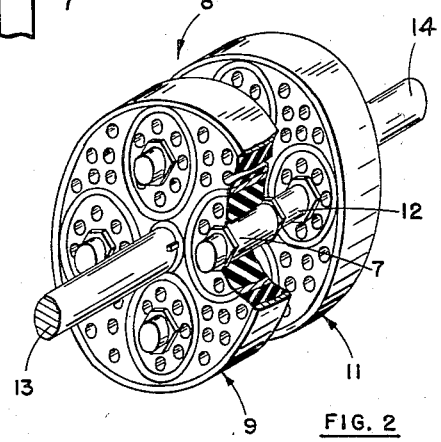
Fig. 2 is a perspective view of a flexible coupling employing two flexible hubs.

In Fig. 2 flexible coupling 8 comprises two identical flexible hubs 9 and 11, similar to hub 10 in Fig. 1, which are joined by four bolts 12 through openings in tubes 7, described relative to Fig. 1. Shafts 13 and 14 are keyed to the inner rings of hubs 9 and 11, respectively. As in the conventional flexible coupling, one shaft drives and the other is driven via the two hubs. In the manner indicated above, the shafts are relieved of twisting impacts and other shocks by the present invention.

Figure 3:
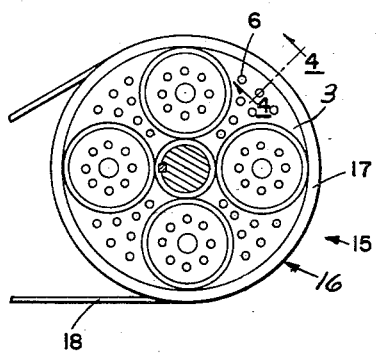
Fig. 3 is an elevational view of a V-belt driven pulley having a flexible hub.
Figure 4:
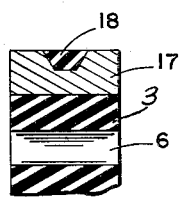
Fig. 4 is a cutaway cross-sectional view taken along the line 4—4 of Fig. 3.

A further example of the use of the present invention is shown in Fig. 3 in a V-belt driven pulley 15. Pulley 15 comprises a body 16, similar to hub 10 in Fig. 1, having a V-notched rim 17. Rim 17 serves as an equivalent to ring 2 in Fig. 1, and the remainder of body 16 is identical to that in the latter figure. V-belt 18 drives pulley 15. Fig. 4 is a fragmentary sectional view of pulley 15 along line 4—4 of Fig. 3, showing in cross-section belt 18, elastomeric body 3, rim 17 and tube 6.

It will be seen that the invention described above provides a substantially improved flexible hub which is particularly well adapted for use with a machine where, due to hard starting, greater torque is applied to a shaft on starting than in normal operation, and that this desirable improvement has been accomplished in a relatively inexpensive and easy to manufacture structure.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A flexible hub comprising an outer ring, an inner ring within and concentric to said outer ring, a plurality of spacer rings tangent to the outer circumference of said inner ring and to the inner circumference of said outer ring, and a resilient material between said last-mentioned outer circumference and said last-mentioned inner circumference substantially surrounding said spacer rings and holding said spacer rings in spaced relationship, said resilient material in substantially continuous contact with the external circumferential surfaces of said spacer rings.

2. A flexible coupling comprising two flexible hubs, means for holding said hubs adjacent to each other; each of said hubs comprising an outer ring, an inner ring within and concentric to said outer ring, a plurality of spacer rings tangent to the outer circumference of said inner ring and to the inner circumference of said outer ring, and a resilient material between said last-mentioned outer circumference and said last-mentioned inner circumference substantially surrounding said spacer rings and holding said spacer rings in spaced relationship.

3. A wheel having a flexible hub comprising an outer ring, said outer ring being the rim of the wheel, an inner ring within and concentric to said outer ring, a plurality of spacer rings tangent to the outer circumference of said inner ring and to the inner circumference of said outer ring, an elastomeric material between said last-mentioned outer circumference and said last-mentioned inner circumference substantially surrounding and secured within said spacer rings, said outer ring adapted so that said wheel can be rotated on its central axis by means of a belt on said outer ring.

4. A grooved rim pulley having a flexible hub comprising an inner ring within and concentric to said rim, a plurality of spacer rings tangent to the outer circumference of said inner ring and to the inner circumference of said rim, and a resilient material between said last-mentioned outer circumference and said last-mentioned inner circumference substantially surrounding said spacer rings and holding said spacer rings in spaced relationship, said resilient material in substantially continuous contact with the external circumferential surfaces of said spacer rings.

5. A flexible hub comprising an outer ring, an inner ring within and concentric to said outer ring, the common center of said inner and said outer rings being the longitudinal axis of said hub, a plurality of spacer rings tangent to the outer circumference of said inner ring and to the inner circumference of said outer ring, a resilient material between said last-mentioned outer circumference and said last-mentioned inner circumference substantially surrounding and secured within said spacer rings, and a plurality of generally longitudinally directed spaced holes of smaller diameters than said rings extending through said resilient material.

6. A flexible hub comprising an outer ring, an inner ring within and concentric to said outer ring, the common center of said inner and said outer rings being the longitudinal axis of said hub, a plurality of tubular spacer rings tangent to the outer circumference of said inner ring and to the inner circumference of said outer ring, an elastomeric material between said last-mentioned outer circumference and said last-mentioned inner circumference substantially surrounding said spacer rings, and a plurality of generally longitudinally directed spaced tubes of smaller diameters than said rings extending through said elastomeric material.

7. A flexible hub comprising an outer ring, an inner ring within and concentric to said outer ring, the common center of said inner and outer rings being the longitudinal axis of said hub, a plurality of spacer rings tangent to the outer circumference of said inner ring and to the inner circumference of said outer ring, a resilient material between said last-mentioned outer circumference and said last-mentioned inner circumference substantially surrounding and within said spacer rings, and a plurality of generally longitudinally directed spaced tubes of smaller diameters than said rings extending through said resilient material, the longitudinal axes of said tubes being substantially parallel to said axis of said hub.

8. A flexible hub comprising an outer ring, an inner ring within said outer ring, resilient cylindrically-shaped spacer members between the outer circumference of said inner ring and the inner circumference of said outer ring said members and said rings having generally parallel axes, and a resilient material between said last-mentioned outer circumference and said last-mentioned inner circumference substantially surrounding said spacer members and holding said spacer members in spaced relationship, said resilient material in substantially continuous contact with the external surfaces of said spacer members between said outer and inner rings.

9. A flexible hub comprising an outer ring, an inner ring within said outer ring, a plurality of spacer rings tangent to the outer circumference of said inner ring and to the inner circumference of said outer ring, and a resilient material between said last-mentioned outer circumference and said last-mentioned inner circumference substantially surrounding said spacer rings and holding said spacer rings in spaced relationship, said resilient material in substantially continuous contact with the external circumferential surfaces of said spacer rings.

References Cited in the file of this patent

UNITED STATES PATENTS

| | | |
|---|---|---|
| 978,249 | Westphal | Dec. 13, 1910 |
| 1,289,461 | Holliday | Dec. 31, 1918 |
| 1,482,097 | Smith | Jan. 29, 1924 |
| 2,048,240 | Wittmer | July 21, 1936 |
| 2,548,839 | Coombes | Apr. 10, 1951 |
| 2,596,501 | Montgomery | May 13, 1952 |
| 2,674,897 | Heinish | Apr. 13, 1954 |